(12) United States Patent
Ling et al.

(10) Patent No.: US 7,596,865 B1
(45) Date of Patent: Oct. 6, 2009

(54) METHOD AND APPARATUS FOR CONNECTING SINK OFF SET FROM SEWER

(76) Inventors: Gary Ling, 299 Bello View, Hayward, CA (US) 94544; Simon Maung, 126 Arden Dale Dr., Daly City, CA (US) 94014

( * ) Notice: Subject to any disclaimer, the term of this patent is extended or adjusted under 35 U.S.C. 154(b) by 244 days.

(21) Appl. No.: 10/981,955

(22) Filed: Nov. 5, 2004

(51) Int. Cl.
*B23P 17/00* (2006.01)

(52) U.S. Cl. .............. 29/890.141; 29/890.14; 29/428; 4/679; 4/681

(58) Field of Classification Search .............. 29/428, 29/890.14, 890.141; 4/321, 679, 681; 210/153; 604/28
See application file for complete search history.

(56) References Cited

U.S. PATENT DOCUMENTS

| | | | | |
|---|---|---|---|---|
| 3,771,522 A | * | 11/1973 | Waysilk et al. ............... | 604/28 |
| 4,038,737 A | * | 8/1977 | Bretone, Jr. ............... | 29/890.14 |
| 4,091,518 A | * | 5/1978 | Rutherford ............ | 29/890.141 |
| 4,112,567 A | * | 9/1978 | Bretone, Jr. ............ | 29/890.141 |
| 6,193,879 B1 | * | 2/2001 | Bowman ..................... | 210/153 |
| 6,651,272 B2 | * | 11/2003 | Bowman ....................... | 4/679 |
| 6,687,926 B1 | * | 2/2004 | Bayley ......................... | 4/681 |
| 7,293,299 B2 | * | 11/2007 | Trickel ......................... | 4/321 |

* cited by examiner

*Primary Examiner*—Rick K Chang
(74) *Attorney, Agent, or Firm*—Robert Samuel Smith

(57) ABSTRACT

An apparatus and method for retrofitting a sink drain to a sewer pipe. A connector tube is provided with a preset curve that is cut at a selected location on the connector to provide a connection between the waste tee connector of a sewer line to a "P" connector. A "circularizing" tool is provided which shapes an elliptical end of a tube cut on a curve to a circle that telescopes into the nipple of a waste tube connector.

1 Claim, 5 Drawing Sheets

METHOD AND APPARATUS FOR CONNECTING SINK OFF SET FROM SEWER

FIELD OF THE INVENTION

This invention relates to pipe connectors and particularly to a connector between a "waste Tee" and a "P" trap connected to a sink.

BACKGROUND AND INFORMATION DISCLOSURE

Remodeling homes is a major part of the residential construction industry. The modern home owner has many options in remodeling kitchens and bathrooms based on the fact that suppliers of home kitchens and bathroom appliances are always coming out with new "more modern" designs of sinks, toilets, bathtubs etc.

Typically, the home owner wants to replace an "old fashioned" sink with a larger more modern (attractive) sink.

FIG. 1 is a top view (prior art) and FIG. 2 ((prior art) is a side view showing the typical drain from a sink connected to the sewer through a "P trap" and "waste Tee" as originally installed. There is shown the sink drain 10, a tail piece 12, a "P" trap 14, a tube connector 16, a waste tee leg 17, a waste tee 19, a vent pipe 13 (open to the air) and a sewer line 20.

FIG. 3 is a sectional view of the "waste-tee" connector 19. The leg 17 of the tee extends perpendicularly from the sewer line 20 and has an internal pipe thread 24 on its end that screws into a short pipe nipple 29. A gasket 21 is positioned on the end of nipple 29. A collar 26 screws onto the nipple 29 and squeezes the gasket 21. The end of the tube 16 is telescoped through the gasket 21 and into the free end of the nipple 29 so that, when the collar 26 is tightened onto the nipple 29, the gasket 21 is squeezed and closes down onto the tube 16 forming a water tight seal.

The sewer drain 20 is typically concealed (embedded) in the building wall 23.

The wall of a newer home is usually a decorated (expensive) wall, often tile.

When the house was originally built with a smaller sink, the architect designed the "P" trap to be in-line with the waste connector and the tube 16 was short, perpendicular to the wall, and straight.

When a new sink is installed (replacing the older sink), the larger sink has a drain that is not "in-line" with the waste tee. The problem is illustrated in FIG. 4 which is a top sectional view showing that the sewer line 20 is not aligned with the sink drain 10.

According to the present state of the industry, there are only two "legal" solutions to make the connection when the drain is offset from the sewer as shown in FIG. 3.

One solution is to break the wall and move the sewer with waste tee into alignment with the new sink drain. This is usually very expensive because it generally involves retailing the wall. Yet this option is taken many times incurring considerable expense for the homeowner.

Another solution is for the plumber to bend the tube to fit in the required space. However, the connecting tube 16 is a chrome plated thin walled brass tube (a showpiece). It is impossible to bend the tube 16 without causing the tube wall to wrinkle and/or collapse. At best, the bent connecting tube is very unsightly—offensive to the homeowner.

A third solution is to solder pieces of tube together to somehow form the convoluted pathway from drain to waste tee. This solution is against the law.

None of these solutions provide the satisfaction to the homeowner that is provided by the present invention.

SUMMARY OF THE INVENTION

It is an object of this invention to connect a waste tee from a sewer line to a P connector connected to a drain of a sink where the drain is permanently offset from the sewer line.

This invention is directed toward a connector that can be modified by a plumber to connect a permanently installed sewer line and the otherwise inaccessible drain of a sink.

The connector is a tube having a 90° elbow on one end. The other end of the elbow has a thread that is screwable onto the open end of a "P" connector.

The tube is curved typically about 22.5°-45° between the ends of the tube wherein the plane of the curve is perpendicular to the plane of the elbow. The location of the bend is in a range between three and seven inches from the centerline of the "P" trap leg connected to the elbow of the tube connector.

When the relative locations of the drain and sewer line require that the tube connector be cut on the curved section of the connector, the resulting cut edge is an ellipse so that the tube will not telescope into the Tee connector as cut. For this situation, a forming tool of this invention is provided to "circularize" the cut end of the tube so that the tube can be coupled to the standard waste connector. The forming tool comprises a tapered bar that telescopes into the cut end of the tube with expanding jaws that force the tube into a circular configuration.

DESCRIPTION OF A BEST MODE

Figure 5A:
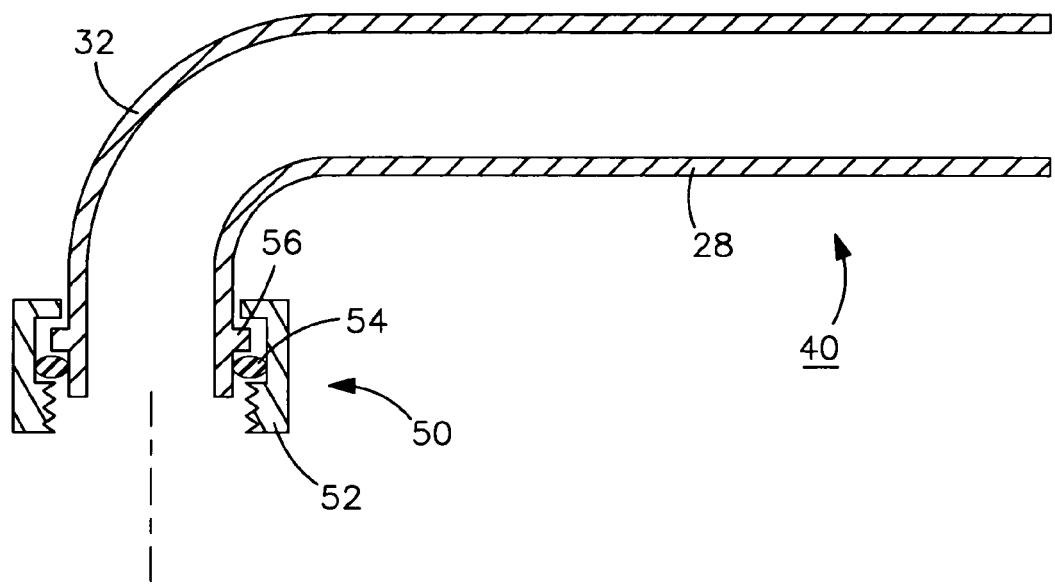
FIG. 5A shows the connector of the invention.
Figure 5B:
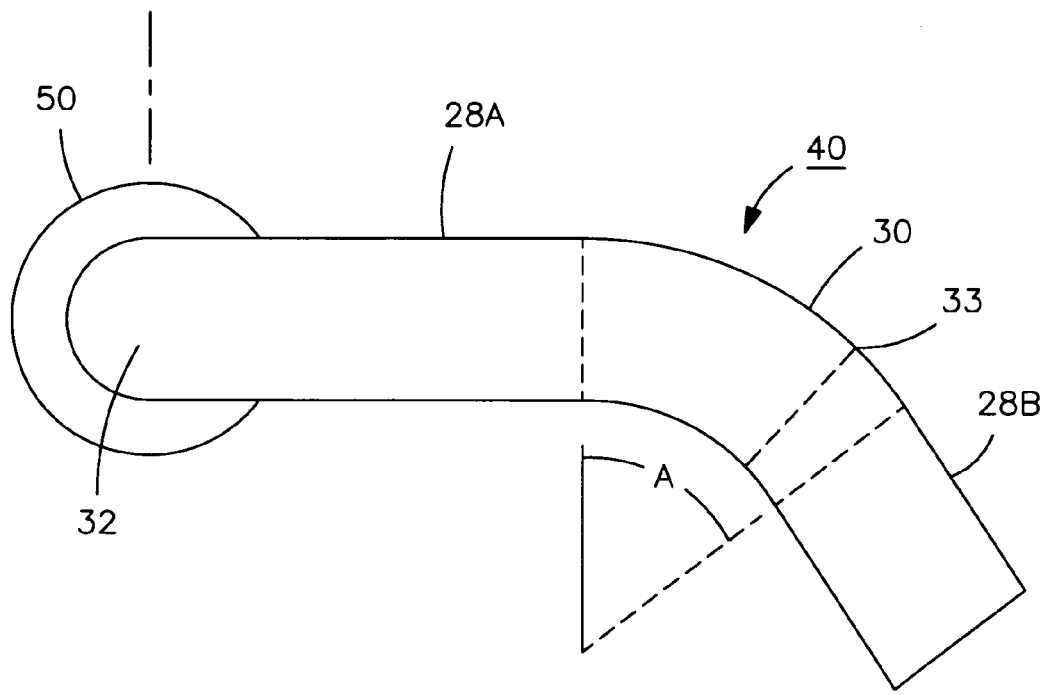
FIG. 5B is a top view of FIG. 5A.

Turning now to a discussion of the drawings, FIGS. 5A and 5B are two views perpendicular to one another showing the connector 40 of this invention. FIG. 5A is a sectional view to show the standard "P" connector 50 to best advantage including a collar 52, gasket 54 and shoulder 56 on the tube 16

There is shown a tube 28A having a curve 30 between the ends of the tube 28 and a second straight section 28B.

One end of the tube section 28A has an elbow 32 perpendicular to the bend 30. The free end of the elbow 32 has a standard "P" connector including a shoulder 56, a collar 52 with a thread that is threadable into the free end of a "P" trap (not shown in FIG. 5).

A straight section 28A between the curve section 30 and elbow 32 is shown.

The other end of section 28A is communicates with a curved section 30 in a plane perpendicular to the elbow. The other end of the curve section communicates with a straight section 28B.

The other end 31 of the tube 40 must telescope into the free end of the open end of the waste Tee using a technique and tool of this invention.

Figure 1:
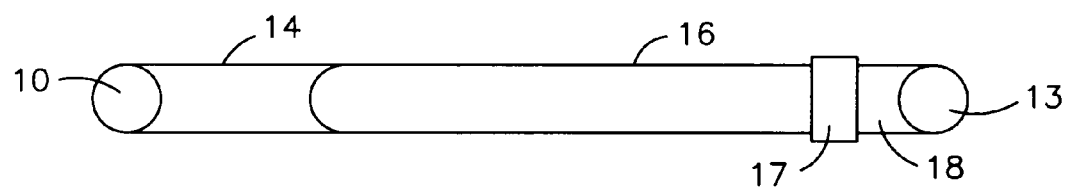
FIGS. 1 and 2 show a sewer coupled to a sink drain according to the prior art.
Figure 2:
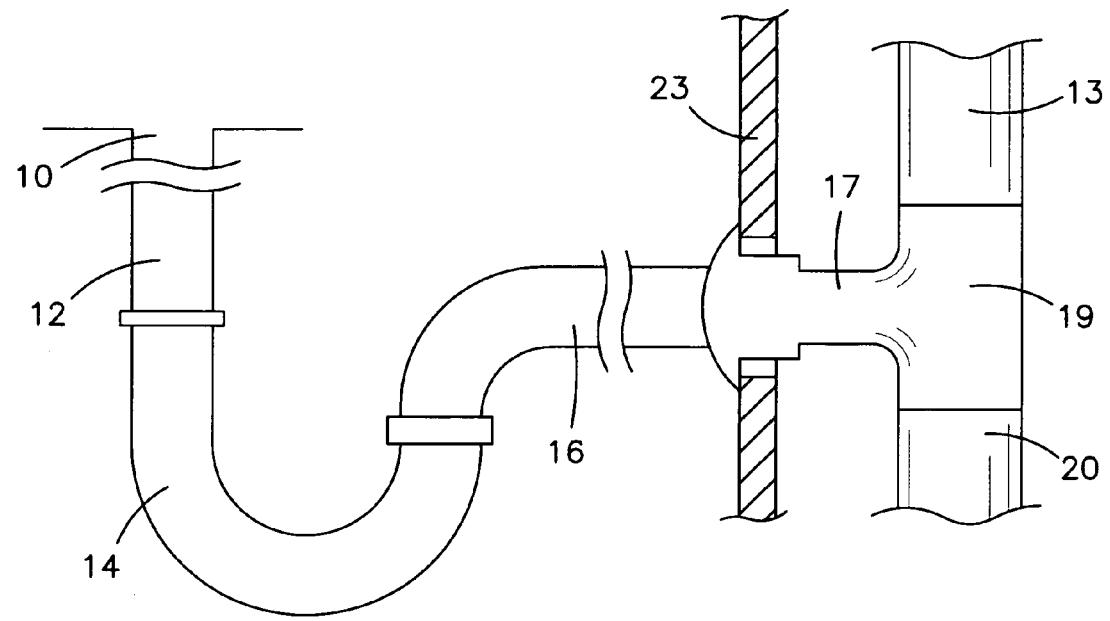
Figure 3:
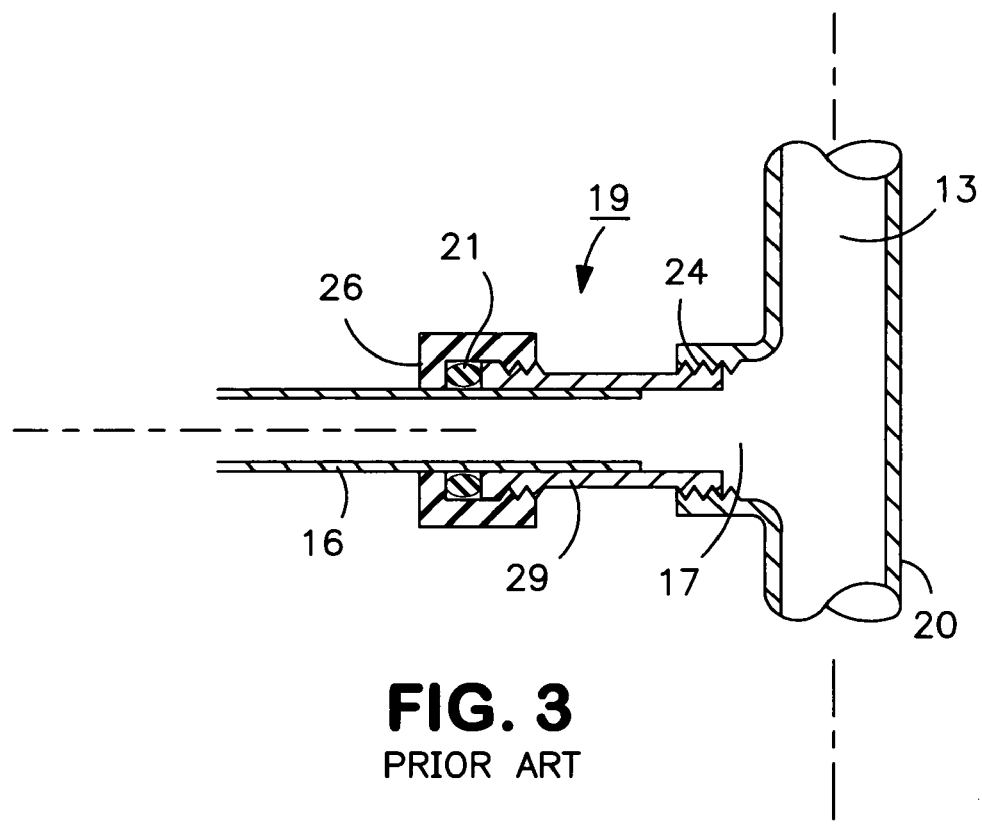
FIG. 3 shows a waste tee connector according to the prior art.
Figure 4:
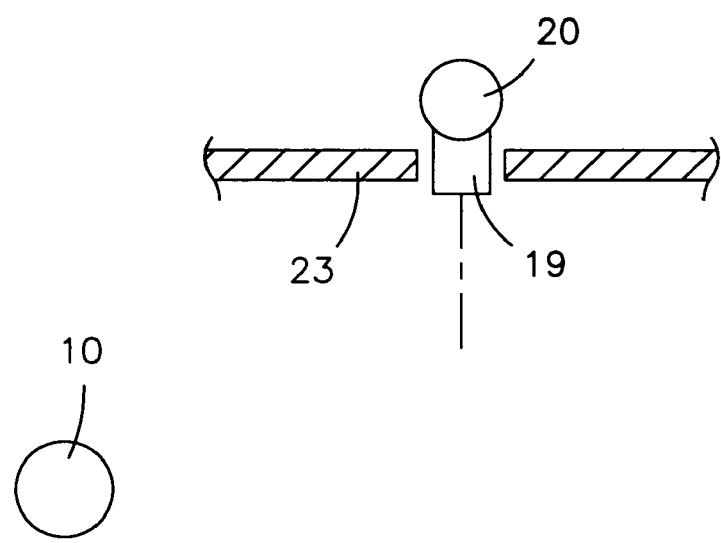
FIG. 4 shows the problem of a sink drain offset from the sewer.

In order for the connector 40 of this invention be adaptable to a range of positions of the "P" trap relative to the waste Tee it is normally necessary for the plumber to cut the tube at some location depending on the location of the sink relative to the drawing (see FIG. 4.

Figure 6:
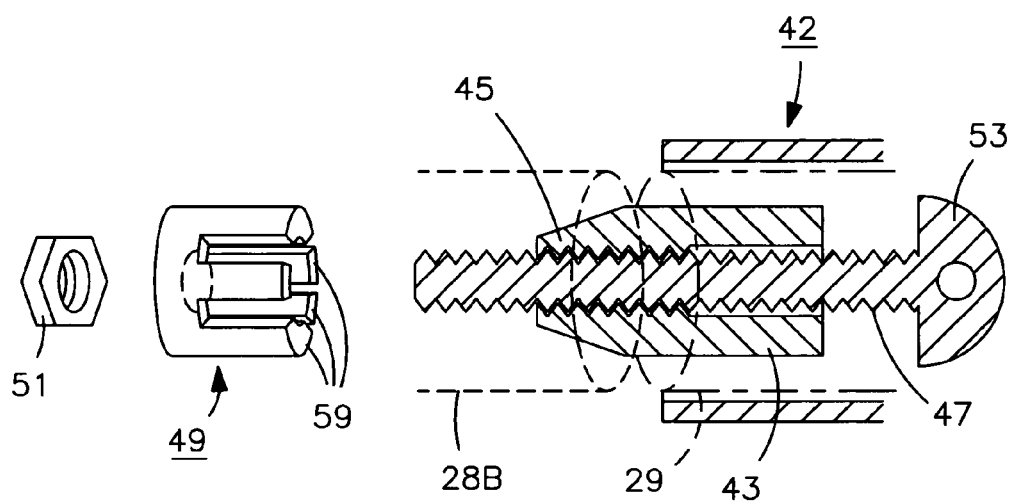
FIG. 6 shows the tube forming tool of this invention.

The plumber has two degrees of freedom for adjusting the position of the "P" trap relative to the leg of the waste Tee. These degrees of freedom are illustrated in FIG. 6.

One adjustment is orientation of the "P" trap that can swivel around the axis of the free end of the elbow on one end of the tube.

The second adjustment is selection of a location 33 where the plumber cuts the tube.

The cross section of the curved section of the tube is elliptical. When the tube is cut anywhere on the curve, the tube 40 will not telescope into the waste tee leg because of the elliptical cross section. This must be corrected using a forming tool according to the method of this invention.

FIG. 6 shows a forming tool 42 that is slid through the waste Tee nipple 29 (in phantom) and into the cut end of the tube 28B (in phantom). The bar 43 has a taper on one end 45. A threaded rod 47 is screwed through the bar 43 and then through a spanning jaw 49 secured on the end of the threaded rod 47 by nut 51. A handle 53 is mounted on the opposite end of the threaded rod 47.

Figure 7:
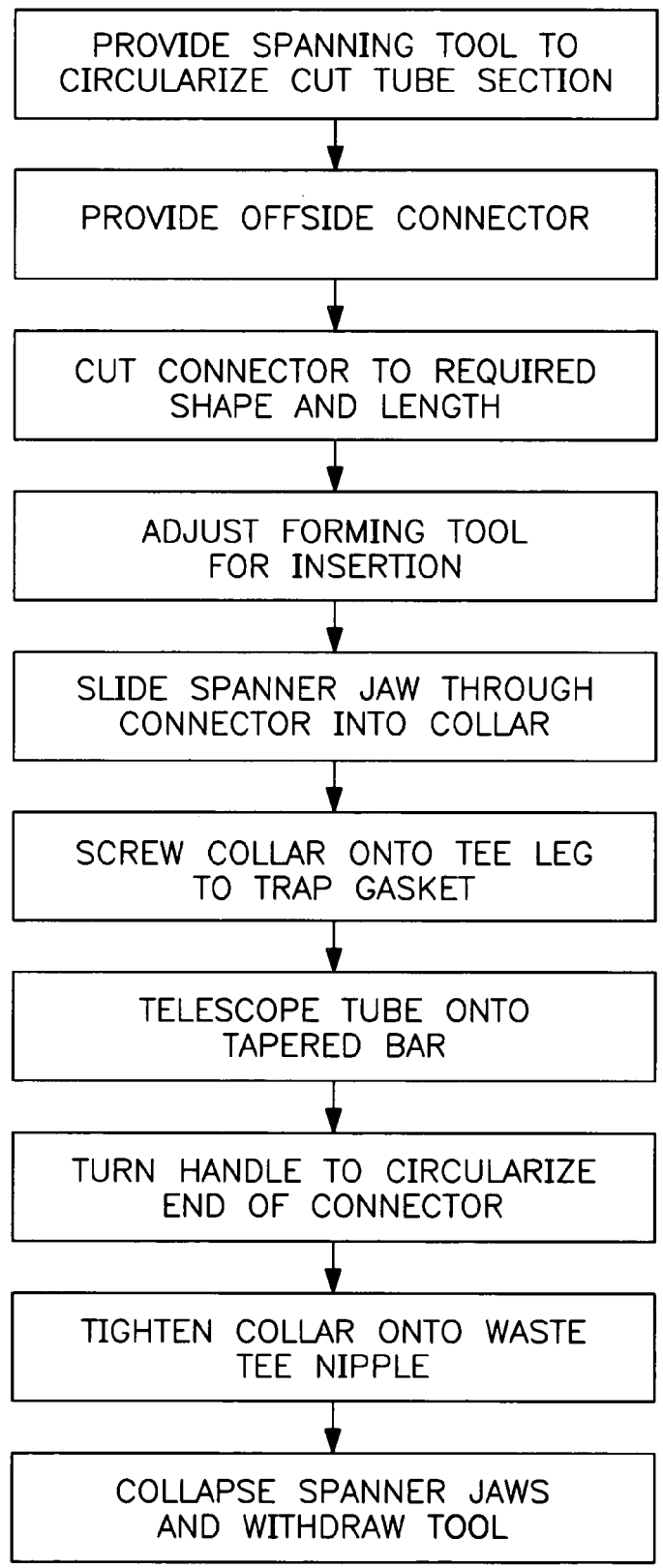
FIG. 7 is a flow chart listing steps for practicing the invention.

The method of installing a connector of this invention between a waste tee and a "P" trap use is illustrated in the flow chart of FIG. 7.

In step 1 an off side tube 40 of this invention is provided as shown in FIG. 5B above, being a straight section having an elbow on one end with a thread attachable to a "P" trap and a curve intermediate the tube ends where the plane of the curve is perpendicular to the plane of the elbow.

In step 2, a portion of the curved section is cutoff leaving the tube with a total length and configuration that will permit coupling the cut end of the tube to the waste tee (fixed in a drainpipe) and the elbow end to one end of a "P" trap. The other end of the "P" trap is swivally positionable for attachment to a (kitchen) drain. The cut end of the tube is elliptical by virtue of the curve in the tube.

In step 3, the handle on the threaded rod is turned so as to partially disengage the spanner jaw from the tapered end of the bar. The outside diameter of the spanner jaw is thereby contracted so that the bar with contracted spanner jaw can be telescoped through the waste tee nipple.

In step 4, the waste tee collar and gasket are slid over the contracted spanner jaw and the end of bar. Then the collar is screwed onto the waste tee leg so as to trap the gasket between the collar and the end of the waste tee leg.

In step 5, the elliptically shaped cut end of the tube is slid onto the bar, through the collar and gasket and into the waste tee leg.

In step 6. The handle on the end of the threaded rod (opposite the spanner jaws) is turned drawing the spanner jaw down on the taper and forcing the spanner jaws 59 to expand inside the elliptical tube. The end section of the tube will be forced into a circular shape.

In step 7, the collar is screwed further onto the waste tee nipple thereby squeezing the "circularized" tube and retaining the circular shape.

In step 8, the handle is turned sufficiently to collapse the spanner jaws so that the bar with spanner jaw can be withdrawn from the end of the waste tee nipple opposite the tube.

The tool and method of this invention provide a connector that the plumber customizes to enable the plumber to connect a permanently installed waste tees to an otherwise inaccessible sink drain.

FIG. 8 is a top view of the connection illustrating that, by selectively fitting the tube, Variations and modifications of this invention may be contemplated after reading the specification and studying the drawings which are within the scope of this invention.

For example, the two sections may form an angle (angle A in FIG. 5B) with respect to one another wherein the angle is selected from a range of angles between 15° and 55°.

The forming tool is useful as a standalone tool for repairing tubes that have been accidentally bent.

It is therefore desired that the scope of the invention be defined by the appended claims.

What is claimed is:

1. A method for connecting a fixed drain to a fixed waste tee which includes the steps:
   A) providing a forming tool comprising:
      a bar (43) dimensioned to telescope into the waste tee nipple (29);
      said bar (43) having a taper (45) on one end;
      a threaded rod (47) screwed through the bar (43) and extending from both ends of the bar;
      a spanner jaw (49) secured to an end of the threaded rod (47) extending from the tapered end of said bar (43);
      a handle (53) mounted on an opposite end of said threaded rod (47) extending from said bar;
   (B) providing an off side connector being a tube section (28A) having an elbow (32) on one end with a connecting means for attaching said end of the tube section attachable to a "P" trap and a curved section on intermediate ends of a tube where a plane of a curved section is perpendicular to a plane of the elbow;
   (C) cutting a portion of said curved section leaving the tube with a total length and configuration to permit coupling the cut portion of said tube to a fixed waste tee and an end of the elbow to one end of the "P" trap swivally coupled to a fixed drain; whereby the cut portion of the tube is elliptical in shape;
   (D) turning the handle on the threaded rod to partially disengage the spanner jaw from the tapered end of the bar and reduce an outside diameter of the spanner jaw by providing the bar with a contracted spanner jaw that is telescopable through the waste tee nipple;
   (E) telescoping the contracted spanner jaw and the bar through a waste tee collar and gasket and an end of the connector;
   (F) screwing the collar onto a waste tee leg with the gasket trapped between the collar and an end of a waste tee nipple;
   (G) telescoping the elliptically shaped cut end of the tube into the tapered end of the bar, through the collar and gasket and into the waste tee leg;
   (H) turning the handle on the end of the threaded rod whereby the spanner jaw is drawn onto the tapered end and said spanner jaws are forced to expand inside the cut end of the tube whereby the cut end section of the tube is forced into a straight circular shape;
   (I) screwing the collar further onto the waste tee nipple whereby the end of the tube that has been circularized retains a circular shape and a seal between the gasket, the collar and the nipple is created that retains a circular cross sectional shape of said tube; and
   (J) turning the handle sufficiently to collapse the spanner jaws and withdraw the bar from the end of the waste tee nipple opposite the tube.

* * * * *